United States Patent
Shaltis

[15] 3,695,437
[45] Oct. 3, 1972

[54] OIL FILTER WITH IMPROVED ANTI-DRAINBACK VALVE

[72] Inventor: Robert J. Shaltis, Hastings, Mich.

[73] Assignee: Hastings Manufacturing Company, Hastings, Mich.

[22] Filed: Jan. 11, 1971

[21] Appl. No.: 105,426

Related U.S. Application Data

[63] Continuation-in-part of Ser. Nos. 36,971, May 13, 1970, and Ser. No. 39,741, May 22, 1970, abandoned.

[52] U.S. Cl. .................210/136, 210/440, 210/443
[51] Int. Cl. .....................B01d 35/14, B01d 27/10
[58] Field of Search.......210/130, 136, 440, 443, 457

[56] References Cited

UNITED STATES PATENTS

| | | |
|---|---|---|
| 3,567,023 | 3/1971 | Buckman et al...........210/130 |
| 3,184,062 | 5/1965 | Humbert, Jr. .............210/130 |
| 3,589,517 | 6/1971 | Palmai......................210/136 |

Primary Examiner—Frank Ao Spear, Jr.
Attorney—Munson H. Lane

[57] ABSTRACT

A combined cartridge seating and oil drainback preventing member is interposed between a filter cartridge and the end plate of a cartridge casing. The member is of elastomeric material and includes a thick inner annular edge portion in engagement with the end plate between oil inlet and oil outlet openings, and a thin outer annular body portion which overlies the inlet openings but is deflectable by pressure of incoming oil. The thick inner annular edge portion of the member is formed with a wide flat annular seat for a tubular adapter on the cartridge which is frictionally received in the seat so that the member may be supported on the adapter as a unit prior to and during assembly of the cartridge in the casing. The member is shaped so that upon its installation in the filter, its outer body portion is resiliently biased toward the end plate.

7 Claims, 4 Drawing Figures

3,695,437

INVENTOR
ROBERT J SHALTIS

BY Munson H. Lane

ATTORNEY

OIL FILTER WITH IMPROVED ANTI-DRAINBACK VALVE

The present application is a continuation-in-part of my earlier application Ser. No. 36,971, filed May 13, 1970 for Dual Flow, Spin-On Filter; and Ser. No. 39,741, filed May 22, 1970 and now abandoned for Valve Structure for Oil Filters. This invention relates to new and useful improvements in oil filters for internal combustion engines or the like, and in particular the invention concerns itself with disposable filters which are discarded when the cartridge thereof is no longer effective. Such filters have their cartridge contained in a casing which has an end plate provided with a central oil outlet opening and a set of oil inlet openings arranged in a circle around the outlet opening. It is desirable to provide some form of valve means to prevent drainback of oil to the engine through the inlet openings when the engine is stopped, and one form of such valve means known in the art is an elastomeric gasket which is interposed between the cartridge and the end plate. The gasket is ring-shaped and includes an inner edge portion which seats on the end plate between the oil inlet and outlet openings, and an outer edge portion which overlies the inlet openings but is deflectable from the end plate under pressure of the incoming oil. When the engine is stopped, the outer edge portion of the gasket returns to the end plate and closes off the inlet openings to prevent drainback. Usually, the filter cartridge is resiliently biased in the casing against the inner edge portion of the gasket. One such device is shown for example in U.S. Pat. No. 3,567,023, granted Mar. 2, 1971 to Kenneth E. Buckman.

The principal object of the invention is to structurally and functionally improve upon the conventional drainback valve arrangement as above outlined, this being attained by providing an elastomeric gasket-type member which serves to prevent drainback as well as to seat the filter cartridge at the end plate of the casing. More particularly, the gasket-type member of the invention is especially suited for coaction with a tubular outlet adapter on the filter cartridge, the arrangement being such that the member is frictionally supported on the adapter as a unit prior to and during assembly of the cartridge in the casing. This enables the assembly to be carried out simply and with convenience, and without the possibility of the gasket-type member becoming displaced during assembly, as can happen with valve gaskets of the conventional type.

Another important feature of the invention is that the gasket-type member is shaped so that during installation it becomes stressed and thereby resiliently biased toward the end plate to assure effective spring-back thereof to the inlet closing position and positively prevent drainback when the engine is stopped.

With the foregoing more important object and features in view and such other objects and features which may become apparent as this specification proceeds, the invention will be understood from the following description taken in conjunction with the accompanying drawings, wherein like characters of reference are used to designate like parts, and wherein.

Figure 1:
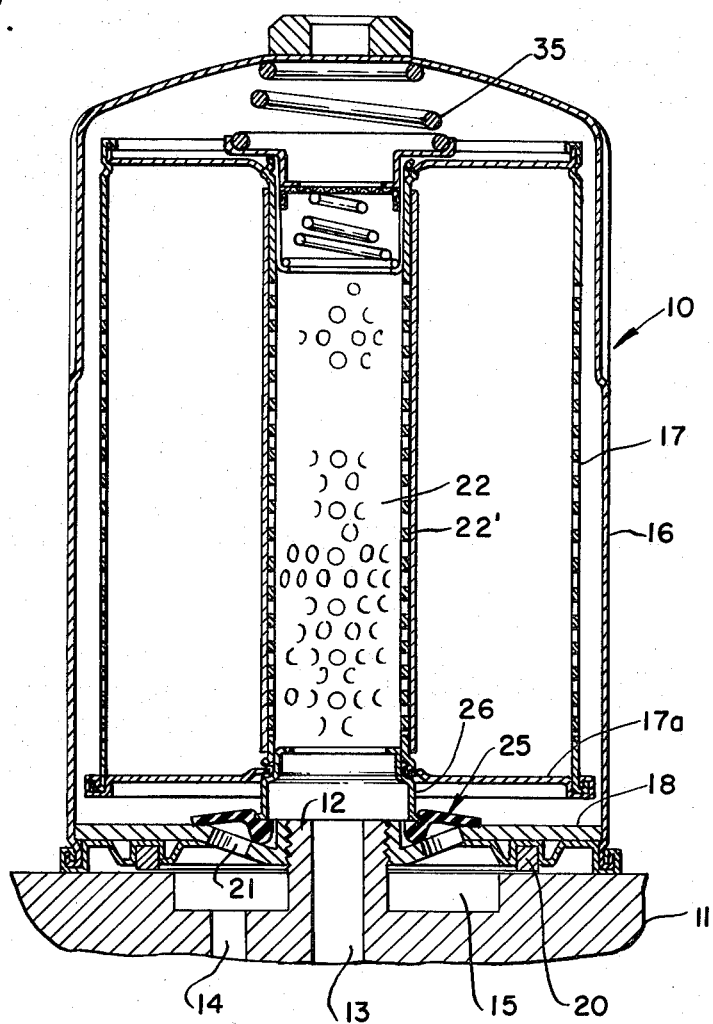
FIG. 1 is a longitudinal sectional view of a filter embodying the invention, the same being shown in position on an engine block.

Referring now to the accompanying drawings in detail, the general reference numeral 10 in FIG. 1 designates a disposable oil filter attached to the block 11 of an internal combustion engine, the block having the usual screw-threaded spigot 12 with an oil return passage 13 therethrough, and an oil feed passage 14 communicating with an open-sided annular recess 15 which surrounds the spigot.

The filter 10 includes the usual cup-shaped casing 16 containing a filter cartridge 17, the end of the casing 16 adjacent the engine block 11 being equipped with a reinforcing end plate 18, as is customary in the art. The end plate 18 is provided with a centrally disposed oil outlet opening 19 (FIG. 3) which is screw-threaded to engage the spigot 12, thus mounting the oil filter on the engine block in the conventional manner as shown in FIG. 1, leakage being prevented by the usual annular sealing ring 20.

The filter cartridge 17 is of the conventional outside-to-inside flow type, with oil flowing from the feed passage 14 and recess 15 in the engine block 11 through a set of inlet openings 21 which are arranged in a circle around the outlet opening 19 in the end plate 18. After passing through the inlet openings 21, the oil flows into the annular space between the casing 16 and the cartridge 17, entering the cartridge from the outside and leaving through a central chamber 22 in the cartridge for return to the engine through the spigot 12 in the outlet opening 19 of the end plate 18. It may be noted that, as is customary, the center portion of the end plate 18 containing the openings 19, 21 is dropped or depressed as indicated at 18a in FIG. 3, and is provided with a re-entrant boss 18b which defines the outlet opening 19 and serves to mount the filter on the engine spigot 12, as already mentioned.

The invention concerns itself primarily with the provision of a gasket-like member, designated generally by the numeral 25, which serves to seat the cartridge 17 at the end plate 18 and also to prevent drainback of oil to the engine through the inlet openings 21 when the engine is stopped. The end of the cartridge 17 adjacent the end plate 18 is provided with a tubular outlet adapter 26 which is in axial alignment with the central chamber 22 in the cartridge and, when the filter is assembled, communicates with the outlet opening 19.

The gasket-like member 25 is particularly shaped to cooperate with the adapter 26 in seating the cartridge 17 at the end plate 18. As such, the member 25 is in the form of a ring of suitable elastomeric material and includes a relatively thick inner annular edge portion 27 and a relatively thin outer annular body portion 28 which is connected to the inner portion 27 by a thin annular neck portion 29, the latter serving as a fulcrum about which the body portion 28 may flex toward and away from the end plate 18, as will be hereinafter described. The inner edge portion 27a defines a circular opening 30 (FIGS. 2 and 3) which receives the outlet boss 18b of the end plate 18 when the member 25 is applied to the end plate as shown in FIGS. 1 and 3. When the member 25 is so applied, the lower extremity 27d of its inner edge portion 27 sealingly engages the end plate portion 18a at a circular area between the inlet openings 21 and the outlet boss 18b, thus isolating the inlet openings 21 from the outlet opening 19. At the same time, the outer body portion 28 of the member 25 overlies the inlet openings 21 and with its outer edge 31 engages the end plate 18, thus closing off the inlet openings 21 and preventing drainback of oil therethrough when the engine is stopped. However, when the engine is running, the pressure of oil entering the inlet openings 21 deflects the body portion 28 of the member 25 away from the end plate 18, thus permitting the oil to enter the casing 16 as aforesaid.

The side of the member 25 facing the cartridge 17 is provided in the inner edge portion 27 thereof with a wide flat annular seat 32 (FIGS. 2 and 3) for the cartridge adapter 26. Preferably, the end of the adapter 26 is equipped with an outturned annular lip 33, and the seat 32 is undercut as at 34 so that the lip 33 may be snap-fittingly received and frictionally held in the undercut 34 of the seat 32, as will be apparent from FIG. 3. By virtue of this arrangement, prior to and during assembly of the filter it is possible to apply the member 25 to the adapter 26 of the cartridge 17 by snap-fitting the lip 33 into the undercut 34 in the seat 32. The cartridge with the member 25 thus supported on the adapter thereof, may then be bodily handled as a unit in an easy and convenient manner and installed in the casing 16 without any danger of the member 25 becoming displaced during the assembly procedure.

As is customary in the art, the cartridge 17 is resiliently biased, as by a spring 35 in the direction of the end plate 18, thus causing the adaptor 26 to bear against the seat 32 and press the lower extremity 27d of the inner edge portion 27 of the member 25 into sealing engagement with the end plate portion 18a as already mentioned. Inasmuch as the sealing action takes place at this point to isolate the inlet openings 21 from the outlet opening 19, it is not necessary for a sealing action to take place between the inner edge portion 27a and the outlet boss 18b itself. Thus, the central opening 30 defined by the inner edge portion 27a may be large enough to accommodate an outlet boss 18b of different sizes. However, from the standpoint of properly centering the cartridge 17 with respect to the end plate 18, it is preferable for the opening 30 to be of substantially the same size as the outside diameter of the outlet boss 18b.

Figure 2:
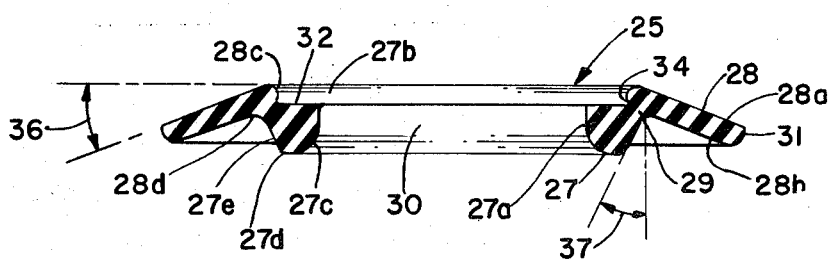
FIG. 2 is a cross-sectional view of the combined cartridge seating and drainback preventing member of the invention.
Figure 3:
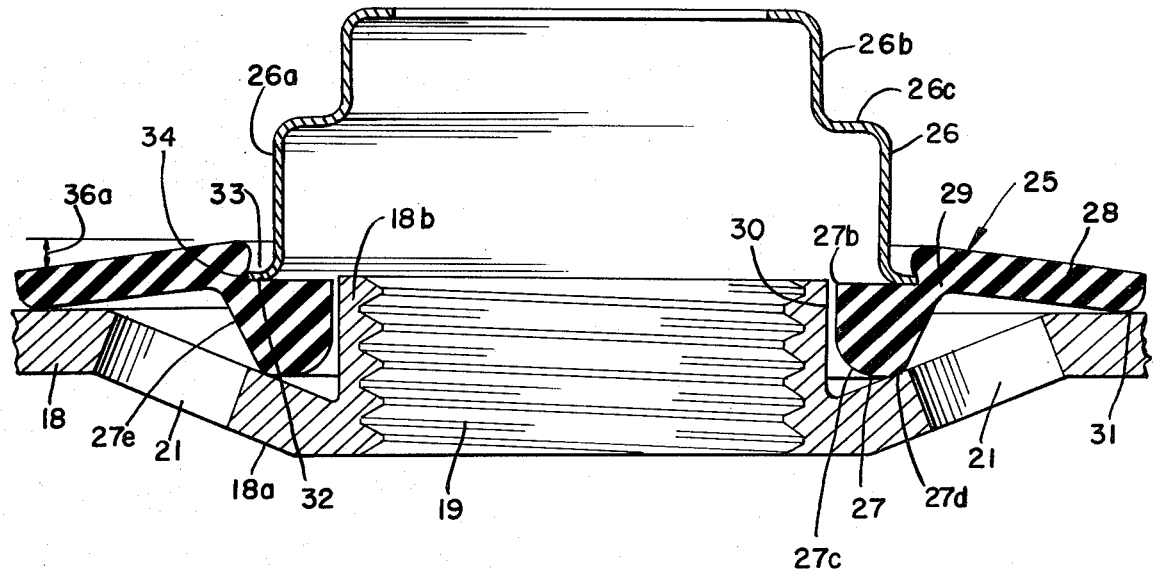
FIG. 3 is an enlarged, fragmentary cross-sectional view showing the member of FIG. 2 interposed between the cartridge adapter and the casing end plate.
Figure 4:
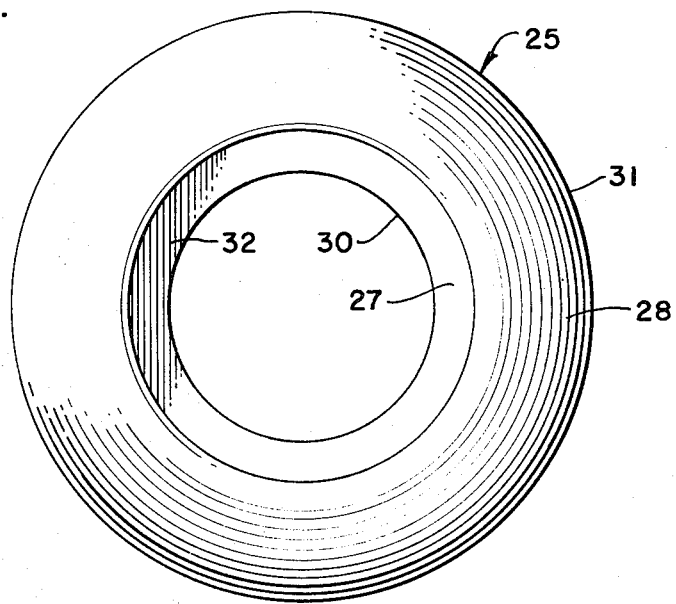
FIG. 4 is a plan view of the member shown in FIG. 2.

Attention particularly is now directed to FIG. 2 which shows the gasket-like member 25 in a relaxed condition, prior to its installation in the filter. It will be noted that the body portion 28 has a shallow frustoconical form, the angular magnitude or steepness of which is indicated at 36 and may be on the order of approximately 20°, although this is governed by the degree of slope of the depressed center portion 18a of the end plate 18. In any event, in the relaxed state of the member 25, the angular magnitude 36 is relatively large, but when the member 25 is installed in the filter and is pressed by the spring-loaded cartridge 17 toward the end plate 18, the angular magnitude 36 is lessened as indicated at 36a in FIG. 3. This causes the body portion 28 to become stressed and, in attempting to resume its relaxed form, the body portion 28 is resiliently biased toward the end plate 18 to effectively close off the inlet openings 21 in the absence of incoming oil pressure.

With further reference to the gasket-like member 25 it will be noted that the edge portion 27 is defined by the inner cylindrical surface portion 27a, the wide upper flat annular seat 32 which lies in a plane perpendicular to the axis of the cylindrical surface portion 27a and intersects the upper rim of the cylindrical surface 27a along the edge 27b, a rounded bottom surface portion 27c extending from the lower end of the cylindrical surface portion 27a and intersecting an upwardly and outwardly diverging outer surface portion 27e at the annular lower or bottom edge 27d. The cylindrical surface portion 27a is preferably of slightly larger diameter than the outside diameter of the outlet boss 18b so that the gasket-like member 25 loosely fits around the outlet boss 18b in the manner shown in FIG. 1 and 3 for ease of assembly.

The thin annular body portion 28 preferably has parallel top and bottom surfaces 28a and 28b respectively, terminating at the outer edge 31. The bottom surface 28b is joined to the upwardly and outwardly inclined surface portion 27e by an annular arcuate inside corner portion 28d in the area of the neck 29. The annular body portion 28 has an inner edge 28c which forms a juncture between the upper surface portion 28a and the seat portion 32.

By way of example only, the upwardly and outwardly inclined surface 27e forms an angle 37 with the vertical of approximately 25° and the annular body portion 28 is designed to flex when approximately 1 to 1.5 p.s.i. is exerted and to return into sealing engagement with the end plate 18 when pressure is relaxed. The gasket 25 may be formed from different elastomeric materials, such as natural and synthetic rubber including for example Goshen 1987,85 Duro Burna-N.

The adapter 26 has an enlarged tubular base portion 26a and a reduced neck portion 26b which snugly fits inside the perforated central tube 22' of the filter cartridge 17 in a manner such that the bottom 17a of the filter cartridge will rest on the shoulder 26c connecting the base portion 26a with the reduced neck portion 26b. When assembled the enlarged base portion 26$^a$ of the adapter rests on the flat annular seat 32 of the gasket like member 25. The diameter of the base portion 26a is such that when it rests on the annular seat portion 32, the base portion 26a will overlie approximately the relatively narrow annular area of contact 27d (see FIG. 3) between the thick inner annular edge portion 27 and the end plate 18. Therefore forces applied by the spring 35 through the filter cartridge 17 will be transmitted through the base portion 26a of the adapter 26 onto the seat 32 in an area directly over the annular area of contact 27d.

While in the foregoing there has been described and shown the preferred embodiment of the invention, various modifications and equivalents may be resorted to within the spirit and scope of the appended claims.

What is claimed as new is:

1. In a disposable oil filter, the combination of a cup-shaped casing having an end plate provided with a central oil outlet opening and with a set of oil inlet openings arranged in a circle around said outlet opening, a filter cartridge disposed in said casing and resiliently biased toward said end plate, a tubular adapter provided centrally on said cartridge adjacent the end plate, and a combined cartridge seating and oil drainback preventing gasket-like member interposed between the end plate and said adapter and separable therefrom, said member being formed integrally from elastomeric material and comprising a ring having a relatively thick inner annular edge portion engaging said end plate between said oil inlet and outlet openings and also having a relatively thin outer annular body portion which overlies said inlet openings but is deflectable from said end plate by pressure of incoming oil, the inner annular edge portion of said gasket-like member being provided with an annular seat frictionally receiving said adapter therein whereby said member may be supported on the adapter as a unit prior to and during assembly of said cartridge in said casing(.), said adapter being provided with an outturned annular lip, and said annular seat in said gasket-like member being flat and provided with an annular undercut having said lip disposed therein, whereby to positively assist in supporting said member on said adapter as aforesaid.

2. The device as defined in claim 1 wherein said gasket-like member also includes a reduced annular neck portion connecting said outer body portion to said inner edge portion, said neck portion affording fulcrum means for movement of said outer body portion toward and away from said end plate.

3. The device as defined in claim 1 wherein said outer annular body portion of said gasket-like member has a shallow frusto-conical form with its major end oriented toward said end plate and its minor end surrounding said seat, the angular magnitude of said frustoconical form being greater when said member is relaxed prior to its installation in the filter than it is after the member is installed, whereby said outer annular body portion of the installed member is pre-stressed and resiliently biased toward said end plate.

4. The device as defined in claim 1 wherein said inner annular edge portion of said gasket-like member includes an inner cylindrical surface portion, a curved bottom portion joining said inner cylindrical surface portion at one extreme, and an upwardly and outwardly diverging outer surface portion extending from the bottom extreme of said curved bottom portion to a juncture with said relatively thin outer annular body portion.

5. The device as defined in claim 4 wherein said end plate is provided with an inwardly, and axially extending boss surrounding said central oil outlet opening, and wherein said inner cylindrical surface portion of said gasket-like member loosely surrounds said boss.

6. The device as defined in claim 4 wherein the said curved bottom portion and said upwardly and outwardly divergent outer surface portion form at their juncture an edge which provides a relatively narrow annular area of contact between said thick inner annular edge portion and said end plate.

7. The device as defined in claim 6 wherein said tubular adapter has a base portion which rests on said annular seat, said base portion being of a diameter such that while it rests on said annular seat the base portion overlies said relatively narrow annular area of contact between said thick inner annular edge portion and said end plate.

* * * * *